United States Patent
Pous et al.

(10) Patent No.: US 10,860,816 B2
(45) Date of Patent: Dec. 8, 2020

(54) SYSTEM FOR TAKING INVENTORY AND ESTIMATING THE POSITION OF OBJECTS

(71) Applicant: Keonn Technologies, S.L., Barcelona (ES)

(72) Inventors: Rafael Pous, Barcelona (ES); Marc Morenza-Cinos, Esplugues de Llobregat (ES); Ramir de Porrata-Doria, Barcelona (ES)

(73) Assignee: Keon Technologies S.L., Barcelona (ES)

( * ) Notice: Subject to any disclaimer, the term of this patent is extended or adjusted under 35 U.S.C. 154(b) by 0 days.

(21) Appl. No.: 16/312,947

(22) PCT Filed: Jun. 23, 2016

(86) PCT No.: PCT/EP2016/064533
§ 371 (c)(1),
(2) Date: Dec. 21, 2018

(87) PCT Pub. No.: WO2017/220148
PCT Pub. Date: Dec. 28, 2017

(65) Prior Publication Data
US 2019/0156081 A1    May 23, 2019

(51) Int. Cl.
*G06K 19/06* (2006.01)
*G06K 7/10* (2006.01)
(Continued)

(52) U.S. Cl.
CPC ....... *G06K 7/10297* (2013.01); *G06K 7/0008* (2013.01); *G06K 19/0723* (2013.01); *G06Q 10/087* (2013.01)

(58) Field of Classification Search
CPC ............. G06Q 10/087; G06Q 10/0875; G06K 17/0022; G06K 17/0025; G06K 17/0029
(Continued)

(56) References Cited

U.S. PATENT DOCUMENTS 8,538,903 B2 *    9/2013    Attaluri .................. G06Q 50/24
                                                      706/47
9,189,719 B2 *   11/2015    Bremer ............. G06K 17/0022
(Continued)

FOREIGN PATENT DOCUMENTS

EP            2725519 A1        4/2014

OTHER PUBLICATIONS

International Search Report and Written Opinion for International Patent Application No. PCT/EP2016/064533 dated Mar. 2, 2017, 9 pages.

*Primary Examiner* — Daniel St Cyr
(74) *Attorney, Agent, or Firm* — Lowenstein Sandler LLP (57) ABSTRACT

A system for taking inventory of objects and estimating the position of objects comprising RFID tags, the system comprising: at least one RFID reader moveable in a given space and suitable for detecting RFID tags in the given space; means for estimating the position and/or orientation of the RFID reader in the given space, comprising at least means external to the RFID reader for measuring the position and/or orientation of the RFID reader; means for estimating the position of the RFID tags with respect to the RFID reader; the system being adapted to estimate the position of the objects in the given space using the estimated position of the RFID tags with respect to the RFID reader and the estimated position and/or orientation of the RFID reader in the given space; and the system being adapted to take inventory of the objects using at least information on detected RFID tags.

20 Claims, 6 Drawing Sheets

(51) Int. Cl.
*G06K 7/00* (2006.01)
*G06K 19/07* (2006.01)
*G06Q 10/08* (2012.01)

(58) Field of Classification Search
USPC ............................ 235/385, 462.46, 472.02
See application file for complete search history.

(56) References Cited

U.S. PATENT DOCUMENTS

| | | | |
|---|---|---|---|
| 9,489,813 B1 * | 11/2016 | Beigel | G08B 13/2417 |
| 10,292,005 B2 * | 5/2019 | Jordan | H04W 4/02 |
| 2007/0252676 A1 | 11/2007 | Madej et al. | |
| 2008/0077511 A1 | 3/2008 | Zimmerman | |
| 2008/0143482 A1 | 6/2008 | Shoarinejad et al. | |
| 2009/0002163 A1 | 1/2009 | Farrington et al. | |
| 2010/0039228 A1 * | 2/2010 | Sadr | G06K 7/10366 340/10.1 |
| 2011/0122015 A1 * | 5/2011 | Muehlmann | G01S 5/0036 342/118 |

* cited by examiner

SYSTEM FOR TAKING INVENTORY AND ESTIMATING THE POSITION OF OBJECTS

RELATED APPLICATIONS

The present application is a nationalization of International Patent Application PCT/EP2016/064533 filed Jun. 23, 2016, which is incorporated by reference herein.

FIELD OF THE DISCLOSURE

The present invention is related to a system for taking inventory of objects and estimating the position of objects as well as a corresponding method.

BACKGROUND OF THE DISCLOSURE

At present, systems for taking inventory of objects in a given space, for example a warehouse, are known. There are a plurality of mechanisms known to achieve this. Present systems commonly use RFID technology for detecting objects. For doing so, the objects can be provided with an RFID tag that can be detected by an appropriate RFID reader.

For taking inventory, handheld RFID readers can be provided for manually taking inventory. This requires the operator to carry the RFID reader through the given space (e.g. a warehouse) and bring the RFID reader in close proximity to each object to take inventory.

An alternative approach is to provide RFID readers on autonomous or semi-autonomous robots or drones. These vehicles can move through a warehouse and take inventory of objects.

A further alternative is to provide RFID readers at fixed locations in the warehouse. The RFID readers can be provided with fixed or steerable beam antennas for taking inventory of the RFID-tagged objects.

Furthermore, smart shelves or fixtures are known that already incorporate RFID antennas and RFID readers and can be used to continuously take inventory of objects with RFID tags placed therein.

While the first approach is comparably cheap and requires little maintenance, it is hardly possible to exactly determine the position of the objects for which inventory is taken. The second and third approach at least basically allow for not only taking inventory but to also determine the position of the objects. However, due to the limited accuracy of determining the position of the objects with respect to the respective RFID readers in these approaches, the information obtained on the position of the objects is of little value. The fourth option allows for taking inventory while at the same time determining the position of the objects for which inventory is taken implicitly, for example by providing additional information on where the shelves and fixtures are provided in the given space. However, this approach is very expensive and requires a high degree of maintenance. Furthermore, in case one of the smart shelves is not positioned where it is meant to be, significant failures in determining the position of the objects can occur.

DETAILED DESCRIPTION

A technical problem to be solved by embodiments of the invention is to provide a system for simultaneously taking inventory and determining the position of objects with high accuracy while involving low costs in maintenance and acquisition.

This problem is solved in embodiments by a system for taking inventory of objects and estimating the position of objects as described herein below and method of taking inventory of objects and estimating the position of the objects, as described herein below.

The system for taking inventory of objects and estimating the position of objects comprising RFID tags, according to embodiments of the invention, comprises at least one RFID reader movable in a given space and suitable for detecting RFID tags in the given space and means for estimating the position and/or orientation of the RFID reader in the given space, comprising at least means external to the RFID reader for measuring the position and/or orientation of the RFID reader. The system further includes means for estimating the position of the RFID tags with respect to the RFID reader. Further, the system is adapted to estimate the position of the objects in the given space using the estimated position of the RFID tags with respect to the RFID reader and the estimated position and/or orientation of the RFID reader in the given space and is further adapted to take inventory of the objects using at least information on the detected RFID tags. By combining the position and/or orientation estimations of the RFID reader with respect to the given space and the RFID tags with respect to the RFID reader, the position of the objects can be determined with high accuracy. Furthermore, means for determining the position and/or orientation of the RFID reader can be provided at low cost while the advantage of the RFID technology when taking inventory can be preserved.

In the following, for ease of explanation, reference may be made to determining/measuring/estimating the position of the RFID reader. It is noted that this is not limiting and should be understood to also refer to determining/measuring/estimating the position and/or orientation of the RFID reader. Alternatively, the "position" may simply be understood to refer to characterizing the RFID reader in the given space using all six coordinates in three-dimensional space corresponding to the six degrees of freedom of a three-dimensional body.

In the context of embodiments of the invention, "estimating" should be understood as a determination of a position within a given accuracy. Here, the accuracy of different estimations can be different. For example, estimating the position and/or orientation of the RFID reader in the given space can be performed with an accuracy being different from the estimation of the position of the RFID tags with respect to the RFID reader. The estimation may be performed using data obtained on the position of the RFID reader and the RFID tags. Even though this data can be obtained through measurements, the position of the objects cannot be determined with arbitrary accuracy. Estimating any position as described herein may, therefore, be understood to comprise a measurement step at which a position is measured within a given accuracy using, for example, one or more sensors, and a calculation step at which an estimation of the position is calculated considering the result of the measurement, the uncertainty of the measurement and perhaps means for reducing the uncertainty or refining the measurement. This can also comprise combining two or more subsequent measurements of the same position.

Furthermore, taking inventory by using at least information on the detected RFID tags should be understood to refer to the fact that the RFID reader is suitable for detecting RFID tags in the given space. Detecting a RFID tag can result in issuing a signal transmitted to a central processing unit informing the central processing unit on the detection of an RFID tag. Since the RFID tag of an object can have a unique signature, the object can be uniquely identified. This results in an indication to the central processing unit that a given object is present in the given space. This can be considered "information on a detected RFID tag". The information on detected RFID tags is not limited to this specific example but can also comprise other information or even less information (for example only the information that an object is present without specifying which object it is or only specifying what kind of object that is). Furthermore, the information can also include the estimated position of the RFID tag with respect to the RFID reader and/or the estimated position of the object in the given space. The means external to the RFID reader for measuring the position of the RFID reader should be understood to refer to means that are not moved together with the RFID reader through the given space. The means may also be called external means. Thus, these means do not form part of the RFID reader itself nor of any device to which the RFID reader is attached or on which it is mounted. The external means may generally be considered to refer to means that are provided stationary within the given space.

In one embodiment, the RFID reader is provided as part of a handheld device.

Providing the RFID reader on a handheld device that can, for example, be carried by an operator through the given space allows for individualized and flexible inventory taking and estimation of the positions of the objects.

In an alternative embodiment, the RFID reader can be mounted on an autonomous or semi-autonomous vehicle. In this context, a vehicle is considered to be a movable unit (for example a robot or drone or a cart or the like). A vehicle is considered autonomous if it can navigate and move through the given place without requiring user input (for example by actively controlling the vehicle) during movement. This does not exclude the possibility of user input, for example when initiating the movement. A semi-autonomous vehicle will be a vehicle that requires at least some user input for moving through the given space. For example, a remote control could be used to move the semi-autonomous vehicle through the given space.

The use of autonomous or semi-autonomous vehicles reduces the manpower required to take inventory which can be advantageous especially in view of large warehouses and allows for continuous inventory taking.

In a further embodiment, at least two RFID readers are provided to be movable in the given space. These RFID readers can be provided differently, for example one reader can be provided as a handheld device whereas the other reader is provided as on autonomous or semi-autonomous vehicle. Using more than one RFID reader can reduce the time required to efficiently take inventory and estimate the positions of the objects.

In a further embodiment, one or more first radiofrequency transceivers are provided in the given space, wherein each of the radiofrequency transceivers comprises one or more antennas and one or more second radiofrequency transceivers are provided at or associated with the RFID reader. Furthermore, in this embodiment, the system is adapted to use the first and second radiofrequency transceivers to estimate the position and/or orientation of the RFID reader in the given space. A radiofrequency transceiver is considered provided at the RFID reader if it is arranged on the device or at the device constituting the RFID reader. A radiofrequency transceiver is considered to be associated with the RFID reader if the RFID reader can only be moved together with the radiofrequency transceiver. For example, in case the RFID reader is provided on a vehicle, a radiofrequency transceiver is associated with this RFID reader if the respective radiofrequency transceiver is also provided on the same vehicle. It is noted that the radiofrequency transceivers provided in the given space may be considered to be or form part of the means external to the RFID reader.

Using radiofrequency transceivers for determining or estimating the position of the RFID reader within the given space enhances the accuracy with which the position of the RFID reader can be estimated. Furthermore, especially in cases where more than one radiofrequency transceiver is provided in the given space, the given space can be covered completely with high signal coverage and blind spots can be avoided thus allowing for a complete and accurate determination of the position of the RFID reader in the given space.

In an alternative embodiment, one or more light emitters are provided in the given space and one or more cameras are provided at or associated with the RFID reader or one or more light emitters are provided at or associated with the RFID reader and one or more cameras are provided in the given space. Furthermore, the cameras are adapted to detect the light of at least one of the light emitters and the system is adapted to use information on the detected light to estimate the position and/or orientation of the RFID reader. These means are less expensive compared to high-end systems for determining the position of the RFID reader while still resulting in appropriate accuracy in determining the position of the RFID readers and requiring only little maintenance.

Further, at least two light emitters may be provided and each light emitter may be adapted to emit light differing from each of the other light emitters in at least one of its brightness, frequency, modulation in time and spatial distribution. Thereby, a light pattern can be provided that allows for an accurate and unambiguous determination of the position and/or the orientation of the RFID reader.

The method of taking inventory of objects and estimating the position of the objects comprising RFID tags, according to embodiments of the invention, comprises detecting RFID tags in a given space using at least one RFID reader moving in the given space and estimating the position and/or orientation of the RFID reader in the given space, using means external to the RFID reader to measure the position and/or orientation of the RFID reader, and the method further comprises estimating the position of the RFID tags with respect to the RFID reader. Furthermore, the method comprises estimating the position of the object in the given space using the estimated position of the RFID tags with respect to the RFID reader and the estimated position and/or orientation of the RFID reader in the given space and taking inventory of the objects using at least information on the detected RFID tags. This method achieves high accuracy in the estimation of the position of the objects while, at the same time, allowing for accurately taking inventory of the objects.

In one embodiment, the position of the RFID tags with respect to the RFID reader is estimated using at least one of a geometric model of the RFID reader, an electromagnetic radiation model of the RFID reader, or a measured model of the RFID reader. By using at least one of these models, it is possible to accurately associate the signal received at the RFID reader from an RFID tag with an estimated position of the RFID tag relative to the RFID reader.

In the context of embodiments of the invention, the geometric model refers to a geometric model of the antenna beam of the RFID reader or the RFID tag. This model can also be created depending on the transmitted power of the RFID reader and/or the received power and/or phase of the RFID tag's response. Furthermore, the model can be made dependent on the number of times the RFID tag has been detected in a given time interval. A measured model of the RFID reader can be made by measuring the response of one or more RFID tags at one or more known positions relative to the RFID reader and recording all the relevant parameters, like power, phase, read count and the like, of the RFID tag's response. This RFID tag can be a "reference" tag that is placed at a location in the given space known with high accuracy, such that the model obtained is as accurate as possible. An electromagnetic model of the RFID reader can be understood to be a model obtained by calculating the theoretical response parameters of a tag found in a certain location using the measured or simulated radiation pattern of the one or more antennas used by the RFID reader and/or the one or more antennas used by the RFID tag. This can be facilitated by using the electromagnetic propagation equations derivable from the Maxwell equations, Ohm's law, etc. and using the properties of materials, such as conductivity, dielectric constant, etc.

In a further embodiment, estimating the position of the RFID tag with respect to the RFID reader comprises using a point cloud covering a volume in which the RFID tag could be and using a best fit model to determine the most likely position of the RFID tag within the point cloud. This means that in case the RFID reader detects an RFID tag, this detection does not result in a determination of the position of the RFID tag relative to the RFID reader with infinite accuracy. Rather, due to the construction of the RFID reader, specific limitations with regard to the accuracy of the determination of the position of the RFID tag detected are present. This limited accuracy results in the position of the RFID tag only being determinable in a given volume or area. Assuming that the detected RFID tag is positioned in this area or volume approximated by a point cloud and using a best fit model to determine the most likely position of the RFID tag within the point cloud can result in an improvement of the accuracy at which the position of the RFID tag relative to the RFID reader can be estimated.

The most likely position may be determined using a minimum distance or a maximum likelihood.

Further, heuristics may be used to determine the most likely position of the RFID tag within the point cloud. For a plurality of objects of given types, these heuristics may include that objects of the same type are likely to be placed in the warehouse in close proximity. This can result in a more accurate estimation of the actual position of the objects or can be used to resolve ambiguities regarding the position of the objects.

In one embodiment, the position of the object in the given space may be estimated using at least two estimations of the position of the RFID tag with respect to at least one RFID reader and corresponding estimations of the positions of the at least one RFID reader in the given space. This is especially advantageous if the two estimations of the position of the RFID tag with respect to at least one RFID reader are taken from different measurements in which the RFID reader is positioned at different positions in the given space. Since the position of an RFID tag with respect to the RFID reader can only be determined with a given accuracy, the position of an RFID tag can only be estimated within a volume of finite size. By using two measurements of the position of the RFID tag with respect to at least one RFID reader, the intersection of the respective volumes can be used to improve the accuracy of this measurement.

In a further embodiment, the method may comprise generating a data file comprising the inventory of the objects, wherein a data entry is provided for each object and wherein the estimated position of the object within the given space is provided in or associated with the data entry. Thereby, a single file for later use can be provided that comprises all information not only on the presence of the objects (for example for inventory purpose) but also on their position. This can allow increasing the efficiency by which objects can be obtained from the given space, like a warehouse.

The method may further comprise providing an indication on a display of a handheld device, the indication indicating for areas of the given space whether inventory was already taken and/or whether the position of objects in these areas was already determined and/or estimated.

The areas in the given space may refer to parts of the given space. For example, the space could be divided into sections of same size. Furthermore, an area of the given space may be an area including one or more storage systems like shelves. Providing an indication may be understood to refer to a graphical indication like coloring of the area(s) for which inventory was taken or the position of objects was determined differently from other areas.

This embodiment can be especially useful in case the RFID reader is provided on a handheld device carried around the given space by a user as it frees the user from having to remember where he/she already was and thereby potentially reduce the time needed to take inventory completely. Additionally or alternatively this may be used in a remote control for controlling a robot/drone moving through the space.

Figure 1:
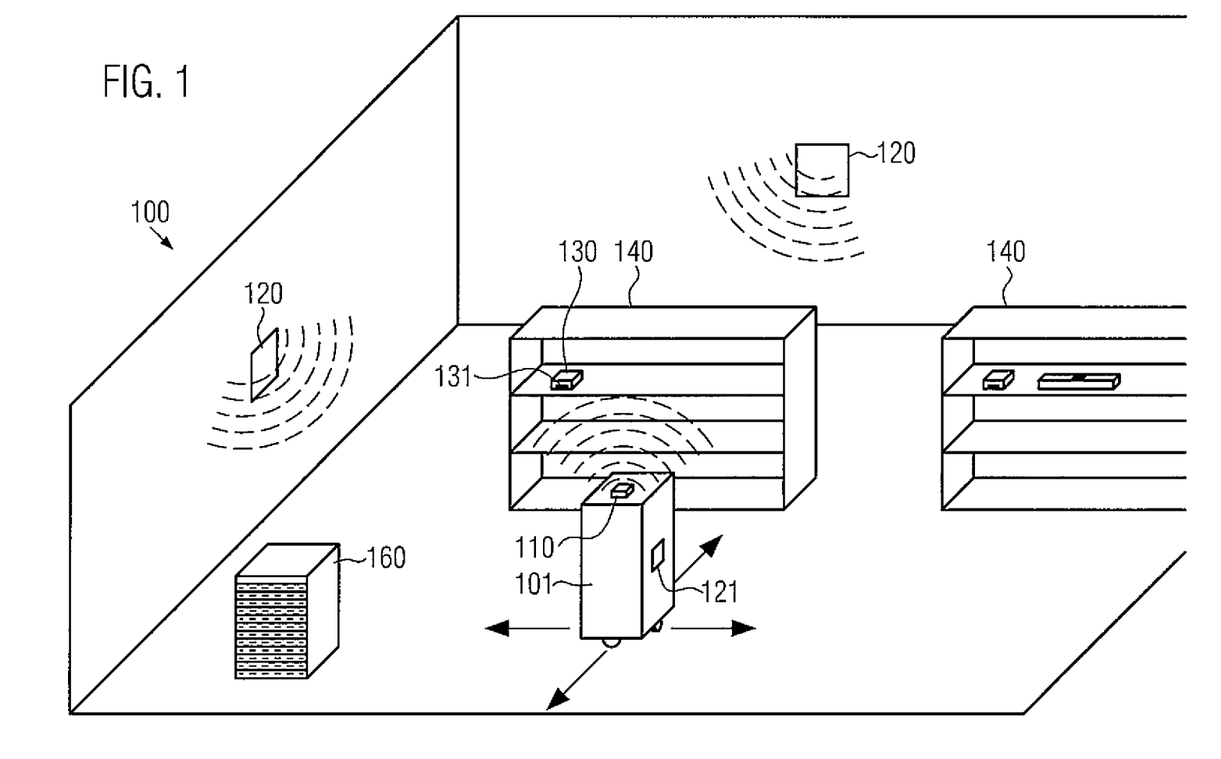
FIG. 1 is a schematic depiction of a space comprising an exemplary system according to one embodiment of the invention.

Referring now to the figures, FIG. 1 depicts a given space 100. This space 100 can be, for example, a warehouse or any other location in which objects can be placed. As an example, objects 130 may be arranged in one or more shelves 140. The shelves 140 are only exemplarily and objects 130 may very well be placed in any other way including placing the objects 130 on the ground of the given space 100.

The objects 130 according to FIG. 1 comprise an RFID tag 131. The RFID tag 131 can be provided as attachment to the surface of the object 130. The attachment can be temporary or permanent. The RFID tag 131 may also be provided in the interior of the object 130. Relevant to embodiments of the invention, however, is that the RFID tag 131 is provided at the object 130 or at least associated therewith, for example attached to or provided at a packaging of the actual object.

FIG. 1 further depicts a system for taking inventory of the objects 130 and estimating their position. According to one embodiment, the system comprises at least one RFID reader 110. The RFID reader 110 is movable in the given space 100 and can detect the RFID tags 131. As an example, the RFID reader 110 may be provided as a robot 101 moving through the given space. The robot 101 is only an exemplary embodiment and should not be construed to be limiting to the invention. The robot 101 may be autonomous in the sense that it can move and navigate through the given space 100 on its own (i.e. without human input/control) to an extent that allows the robot 101 to detect the RFID tags 131 of each object 130 in the given space. The robot 101 may alternatively be provided semi-autonomous in the sense that some user input or control is required in order to move the robot 101 through the given space. Furthermore, the RFID reader 110 may be provided as a flying drone that can fly through the given space 100 in order to detect the RFID tags 131.

Figure 4A:
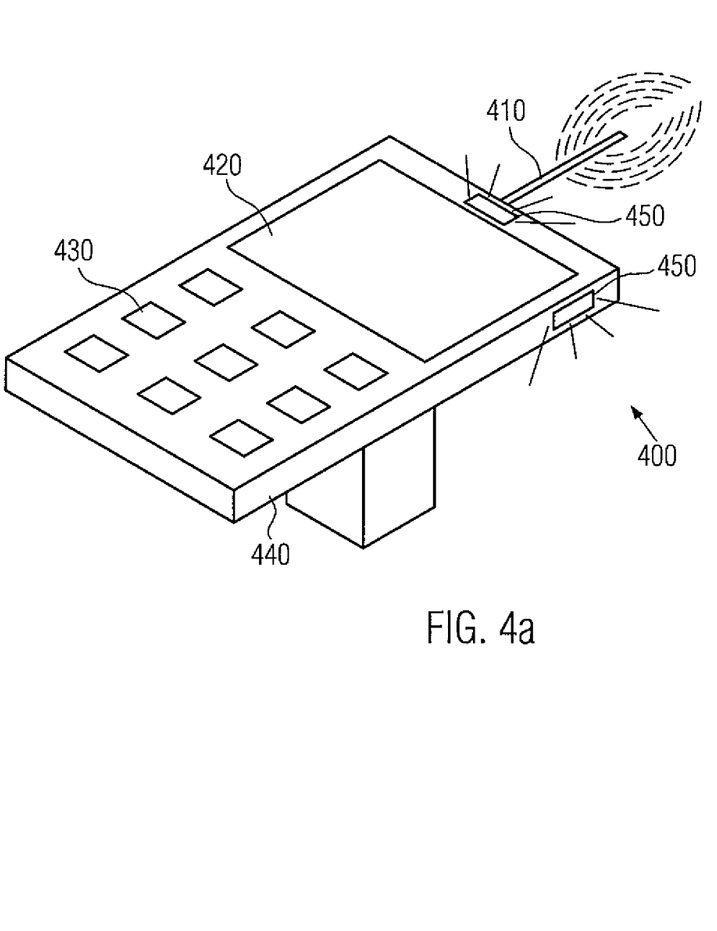
FIGS. 4a-c are schematic depictions of embodiments of devices comprising an RFID reader.
Figure 5:
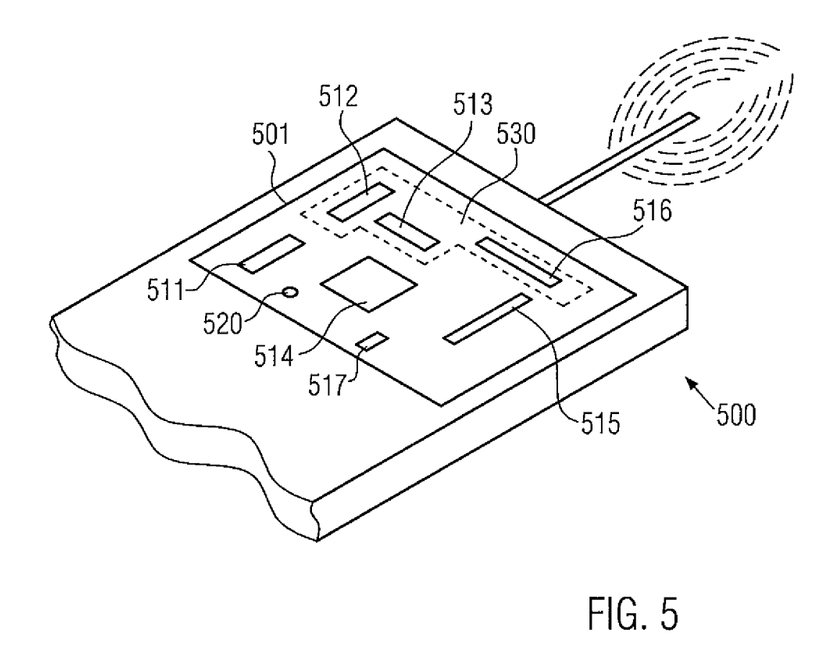
FIG. 5 is a schematic depiction of an embodiment of a handheld device comprising a RFID reader.

In one embodiment that will also be described with respect to FIGS. 4a and 5, the RFID reader 110 is provided as part of a handheld device. Handheld devices can be carried by an operator moving through the given space for taking inventory and can, for example, have the form and size of tablet computers or Smartphones or laptops.

In case more than one RFID reader is provided, each RFID reader may be provided in a different form. For example, a first RFID reader may be provided as or in connection with a handheld device to be carried around the given space by a human whereas a second RFID reader is provided at a flying drone and a third RFID reader is provided at a robot 101 as depicted in FIG. 1.

Furthermore, the system includes means 120 and 121 for estimating the position and/or orientation of the RFID reader 110 in the given space. These means include at least means 120 external to the RFID reader for measuring the position of the RFID reader. These can include stationary means 120 provided in the given space, for example at one or more walls as depicted in FIG. 1. The means 120 can also be provided in a different way. For example, the means 120 themselves can be provided movable in the given space but still external to the RFID reader 110. It is noted that the means 120 can be used to measure the position of the RFID reader 110 in the given space within a given accuracy and may further be used to calculate a proper estimation of the position of the RFID reader 110 also considering the uncertainty of the measurement. This calculation, however, can also be performed by other means, like a (remote) computer system. The means may further include means 121 associated with the RFID reader 101 in that the RFID reader 101 and the means 121 are moved together through the given space. There may be any number of stationary means 120 provided in the given space at any locations.

Several realizations for such means can be provided. For example, the external means 120 may comprise one or more radiofrequency transceivers comprising one or more antennas for receiving radiofrequency signals. The transceivers may be arranged in the given space such that they cover the whole area of the given space 100. This means that any radiofrequency signal emitted by an RFID reader within the given space can be received by at least one of the radiofrequency transceivers, preferably at least two radiofrequency transceivers such that a triangulation of the signal can be performed. In this embodiment, one or more corresponding radiofrequency transceivers may be provided associated with the RFID reader 110. For example, the robot 101 depicted in FIG. 1 may comprise a radiofrequency transceiver 121. The radiofrequency transceiver 121 may be provided such that it can emit a radiofrequency signal that is detectable by one or more of the radiofrequency transceivers 120. Based on the signal (power and/or time of travel for example) received at the radiofrequency transceivers 120, the position of the RFID reader within the given space 100 may be estimated using, for example, a computing system 160 that evaluates and analyzes the signals received at the radiofrequency transceivers. For this, a connection for data exchange may exist between the computing system 160 and the radiofrequency transceivers 120 and potentially transceiver 121.

The computing system is preferably external to the RFID reader in that it is not moved together with the RFID reader, especially in case the RFID reader is integrated into a handheld device. The computing system may, for example, be a central control unit or central processing unit responsible for managing a warehouse automatically. It can also be provided that the computing system 160 is provided within the RFID reader 110 itself or the device at which the RFID reader is mounted (robot or drone or the like).

In an alternative embodiment, the stationary means 120 may be provided as light emitters (lights, lasers or the like) and one or more cameras may be provided at or associated with the RFID reader 110. For example, in the schematic depiction in FIG. 1, the robot 101 may include a camera 121. The camera can be provided as an RGB camera. In a further preferred embodiment, the camera is provided on a handheld device at which the RFID reader is provided. For example, the handheld device can be provided as a tablet or smartphone-like device, comprising a camera on the front side of the device on which the display is provided and perhaps also camera(s) on one or more other side surfaces (especially the rear side of the device). The camera(s) can be used to detect the light emitted by the light emitters and a computing device (internal or external to the handheld) can then calculate the position and/or orientation of the handheld device within the given space.

The one or more cameras 121 may be used to detect the light emitted from at least one, preferably more than one of the light emitters. Based on the detected light, the position of the RFID reader within the given space can be measured within a given accuracy and the system may estimate the position of the RFID reader 110 within the given space taking not only into account the measured position but also the accuracy of the measurement.

In order to increase the accuracy of this estimation, each light emitter may be provided different from each other light emitter. This may comprise that the light emitters emit light at a different brightness. This leads to a varying brightness within the given space depending on the actual location. By using, for example, the computing system 160, the brightness determined by the camera(s) may be translated into an estimation of the location of the RFID reader. Alternatively or additionally, the light emitters may emit light at different frequency (i.e. colors). Further, each light emitter may emit light at a different modulation in time. This may refer to a time-dependent modulation of the brightness or even a pulsed light emitting. Furthermore, the spatial distribution of the light emitted by each light emitter may be different from that of each other light emitter.

Preferably, in this embodiment, the distribution of light is unique for each point in the given space at any time. This allows for an easier estimation of the position of the RFID reader by avoiding ambiguities.

In an alternative embodiment, the stationary means 120 are provided as cameras and one or more light emitters are associated with the RFID reader 110. For example, one or more LEDs can be provided together with the RFID reader.

This may be understood the light emitters or LEDs being provided at the device to which the RFID reader is mounted. This can be advantageous in case the RFID reader is provided at a handheld device since LEDs are usually lightweight and do not require significant amounts of energy to work. By analyzing the images taken by the cameras (for example with the computing system 160) the position of the RFID reader, can be determined/measured within a given accuracy and an estimation of the position of the RFID reader can be provided.

In the above, three exemplary embodiments of the means for estimating the position and/or orientation of the RFID reader were described in which essentially means external to the RFID reader were used to measure and estimate the position of the RFID reader. A further option would be to use acoustic waves to determine the position of the RFID reader within the given space using external means.

Further means may be used in addition, for example to improve the accuracy with which the position and/or orientation of the RFID reader can be measured. Additionally, for example in order to determine the orientation of the RFID reader in the given space, gyroscopes, accelerometers, compasses, inclinometers (sensors for measuring the inclination), odometry sensors in case the RFID reader being provided at an autonomous or semi-autonomous system like a robot, associated with the RFID reader may be used. Furthermore, global positioning systems may be used to estimate the position of the RFID reader. Additionally or alternatively, internal location sensors may be used. For example, in case the RFID reader is provided at a robot like the robot 101, the location sensors of the robot, like laser rangers, three-dimensional cameras, ultrasound sensors and the like can be provided in addition to the determination of the position using means 120 in order to increase the accuracy of the estimation of the position of the RFID reader in the given space.

The system further comprises means for estimating the position of the RFID tags 131 with respect to the RFID reader 101. These means may be provided associated with the RFID reader (for example within the device on which the RFID reader is mounted, like the robot 101 or a handheld device) or may partially or completely be provided as part of the computing system 160 or in any other way. The estimation of the position of the RFID tags may be performed simultaneously to the detection of the RFID tags. In this regard, estimating the position of the RFID tag with respect to the RFID reader may be performed using a geometric model of the RFID reader, an electromagnetic radiation model of the RFID reader or a measured model of the RFID reader which each provide information on the location of a detected object with respect to the RFID reader depending on, for example, the signal strength received at the RFID reader. In this regard, it is noted that an RFID reader usually transmits a radiofrequency signal. This signal is received by the RFID tag and a signal is sent in response. Depending on the signal received at the RFID reader and its properties (for example the time at which it is received, the power received and the like) an estimation of the position of the RFID tag can be performed based on one or more of the above-mentioned models. It is noted that estimating the position of the RFID tag with respect to the RFID reader comprises the step of measuring the position of the RFID tag within a given accuracy and providing an estimation on the position by considering the accuracy of the measurement and potentially further information or methods that might be used to increase the accuracy of the measurement and hence improve the estimation.

In order to increase the accuracy of this estimation, the RFID reader may be provided with one or more directional and/or omnidirectional antennas.

In order to estimate the position of the RFID tag in the given space, the estimation of the position of the RFID tag 131 with respect to the RFID reader 110 and the estimation of the position of the RFID reader in the given space are preferably performed at the same time. This can be achieved by, for example, determining/measuring the position of the RFID reader 110 at specific time intervals (for example 10 times per second). Every time the position of the RFID reader 110 is determined, the RFID reader 110 transmits a radiofrequency signal to detect surrounding objects and measure their position. The system uses the measurement of the position of the RFID reader at a specific time together with the measurements of the positions of RFID tags detected at the same time and the uncertainty associated with these measurements to estimate the position of the RFID tags in the given space within a given accuracy or uncertainty. This embodiment may be referred to as the temporal synchronous estimation of the position of the RFID tags in relation to the RFID tag and the position of the RFID tag in the given space.

Alternatively, the position of the RFID reader in the given space and the position of the RFID tags with respect to the RFID reader may be determined asynchronously. For example, while it can be sufficient to detect the position of the RFID reader in the given space only once in a second, detecting the position of RFID tags with respect to the RFID reader may be performed several times per second. An interpolation between two subsequent times at which the position of the RFID reader in the given space was detected may be used in order to estimate the position of the RFID reader at the time at which the detection of the position of the RFID tags with respect to the RFID reader is performed. It is clear, that this only refers to detections of positions of RFID tags with respect to the RFID reader that are performed in the time interval between the above-mentioned subsequent times. While this can result in more computational effort for providing the interpolation, energy can be saved at the means used for estimating the position of the RFID reader in the given space. This may be especially useful in embodiments in which, for example, radiofrequency transceivers are used for measuring the position of the RFID reader in the given space.

In addition to the estimation of the position of objects 130 within the given space, the system further takes inventory of the objects using information of detected RFID tags. Taking inventory of the objects may be done without regard to their actual position within the given space. However, it is advantageous and preferred to associate the position of the objects within the given space with the inventory taken.

Figure 2:
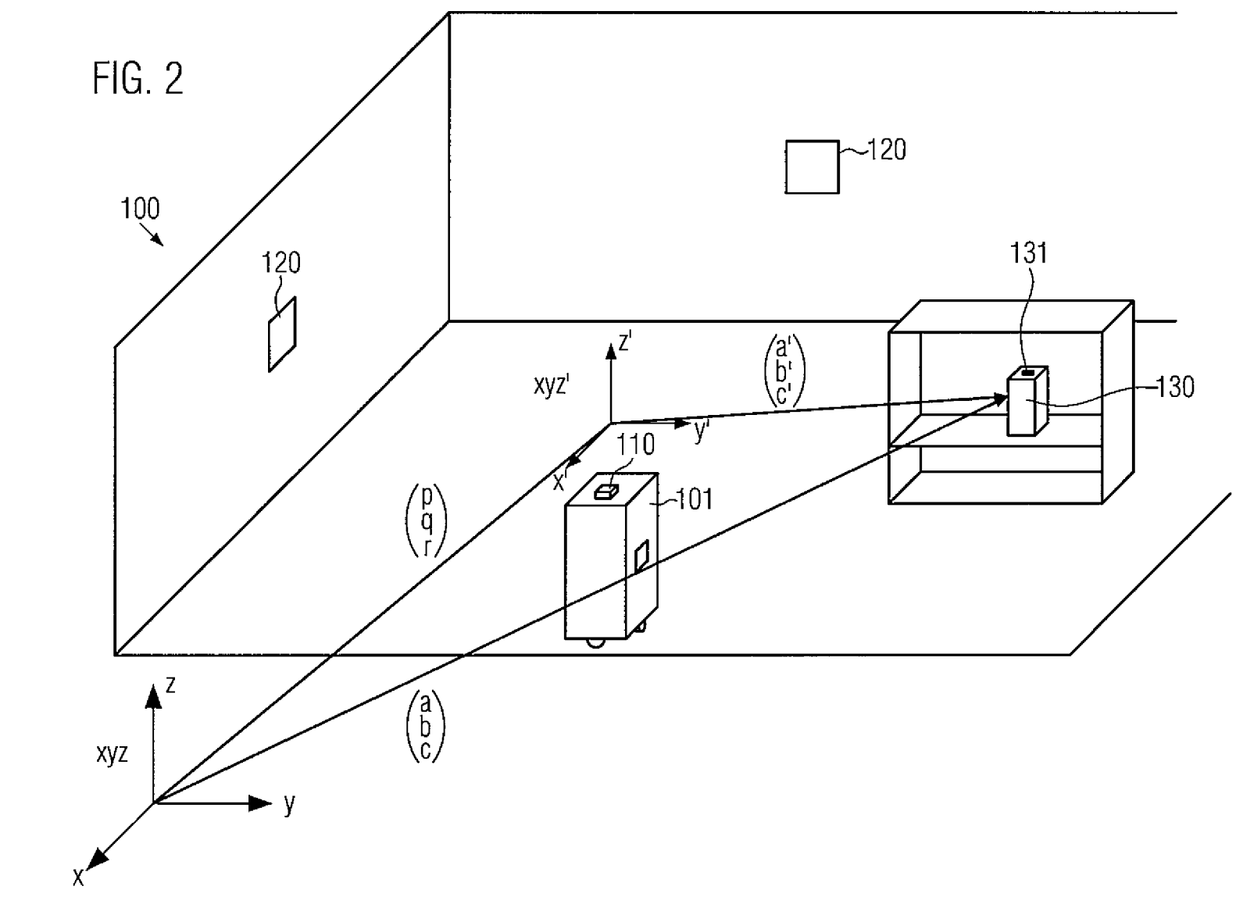
FIG. 2 is a schematic depiction of the relation between different coordinate systems used in embodiments of the invention.

Estimating the position of the detected RFID tags within the given space using the measured and/or estimated position of the respective RFID tags with respect to the RFID reader and the measured and/or estimated position and/or orientation of the RFID reader within the given space is a non-trivial issue. FIG. 2 depicts one solution to this issue according to an embodiment of the invention.

In FIG. 2, the given space 100 (like a warehouse) is depicted with means 120 that allow for an estimation of the position of the RFID reader. In FIG. 2, the RFID reader 110 is, again, depicted as being mounted on a robot 120 without this being limiting to this embodiment. Furthermore, an object 130 comprising an RFID tag is depicted at a given location in the given space. In an embodiment of the invention, in order to estimate the position of the object 130 within the given space 100, two distinct coordinate systems are used.

A first coordinate system XYZ is associated with the given space. This coordinate system is a "stationary" coordinate system in that it does not move with respect to the given space. The coordinate system may be arbitrarily chosen in view of the coordinates used. For example, a Cartesian coordinate system may be used as depicted in FIG. 2 comprising the axes x, y, z. Further, geolocation coordinates (latitude, longitude and altitude) can be used. Alternatively, polar coordinates or spherical coordinates or cylindrical coordinates or any other coordinates may be used. Furthermore, the origin of the coordinate system may be arbitrarily chosen. However, once the coordinate system XYZ is determined, its relation to the given space 100 is fixed. In case geolocation coordinates are used, the conventional system for such coordinates may be applied, as used for example by the global positioning system GPS.

A second coordinate system XYZ' is provided associated with the RFID reader. This means that this coordinate system moves with the RFID reader in that translational and rotational movements (for example tilting) of the RFID reader also result in corresponding movements of the coordinate system XYZ'. This coordinate system comprises the axes x', y', z'. while the coordinate system XYZ' is depicted as Cartesian coordinate system, it may likewise be provided using polar coordinates, spherical coordinates or cylindrical coordinates or any other coordinates considered suitable, for example in view of the transmission profile of the radiofrequency signals transmitted by the RFID reader. Since the RFID reader usually transmits a radiofrequency signal in all directions in order to detect RFID tags, using a spherical coordinate system or a cylindrical coordinate system might be advantageous. For simplicity of explanation, however, reference will be made to Cartesian coordinates. In any case, the origin of the coordinate system XYZ' may be provided within or at least at the RFID reader. It is clear that, since the coordinate system XYZ' moves with the RFID reader, the orientation of the axes of this coordinate system as well as the position of the origin of this coordinate system changes with respect to the coordinate system XYZ as the RFID reader is moved in the given space. Any relation between the orientation of the axes x', y' and z' with respect to the axes x, y, z as well as any relation between the origin of XYZ' and XYZ depicted in FIG. 2 is, thus, only exemplary and cannot be considered limiting.

In order to estimate the position of an object 130 in relation to the RFID reader 110, the coordinates (a', b', c') of the object 130 in the coordinate system XYZ' are measured at a given time t by using the above-described means (transmitting a radiofrequency signal by the RFID reader analyzing the response signal). For simplicity, it can be assumed that the detected/measured position of the RFID tag (which is actually detected by the RFID reader instead of the object) corresponds to the position of the object. The estimated (or, in a first step, measured) position in the system XYZ', however, is only of little value without a relation of this position to the coordinate system XYZ of the given space. This relation, according to an embodiment of the invention, is established by transforming the coordinates (a', b', c') in the coordinate system XYZ' into coordinates (a, b, c) in the coordinate system XYZ. This is achieved by using the position of the RFID reader (and correspondingly the origin of the coordinate system XYZ') at the time t at which the coordinates (a', b', c') are measured by the RFID reader. Assume that, at time t, the RFID reader and hence, the origin of the system XYZ' has the position (p, q, r) in the coordinate system XYZ. Furthermore, its orientation may be given by the angles $(\alpha, \beta, \gamma)$ (Euler angles). The position of the object 130 in the coordinate system XYZ then follows from the equation $$\begin{pmatrix} a \\ b \\ c \end{pmatrix}(t) = \begin{pmatrix} p \\ q \\ r \end{pmatrix}(t) + M(\alpha, \beta, \gamma)(t) \cdot \begin{pmatrix} a' \\ b' \\ c' \end{pmatrix}(t)$$

where $M(\alpha, \beta, \gamma)$ is the rotational matrix transforming between the orientation of the coordinate system XYZ' and the orientation of the coordinate system XYZ. All operators on the right side of this equation are time-dependent and, hence, is the result. However, since the object 130 does usually not move with respect to the coordinate system XYZ, the left side can be considered as resulting in a time invariant position (a, b, c).

The description of FIG. 2 was provided for reasons of simplicity without any regard to potential issues regarding the accuracy with which the position of the RFID reader in the given space and the position of the RFID tag with respect to the RFID reader can be measured. It is clear that the above calculation ignoring any uncertainties with respect to the determination of (a', b', c') and (p, q, r) as well as $(\alpha, \beta, \gamma)$ would only be valid if the system could determine/measure these values with infinite accuracy, which, in reality, is not the case. Rather than the coordinates (a', b', c') and (p, q, r) as well as the angles $(\alpha, \beta, \gamma)$ being definite values or points in space, in the case of the uncertainties of the measurements being considered, these coordinates and angles may be considered to refer to probability distributions represented by, for example, functions or a set of points/particles in the sense of a point cloud. From this it follows that, since the right side of the equation above comprises uncertainties in each of the terms, the left-hand side will also be provided with an uncertainty. Calculating the uncertainty of the left side based on the uncertainties of the right side can be performed by, for example, Bayesian filtering.

To summarize the above, estimating the position of the RFID tag (and hence the object) in the given space is performed by first determining the position and/or orientation of the RFID reader in the given space and the position of the RFID tag with respect to the RFID reader. These determinations or measurements are only possible with a given uncertainty/accuracy. The measurements are then processed in order to obtain an estimation of the position and/or orientation of the RFID reader in the given space and the RFID tag with respect to the RFID reader. This processing can comprise combining the measurements with the respective uncertainties and potentially applying further methods in order to reduce the uncertainties. The obtained estimations are combined to obtain an estimation of the position of the RFID tag within the given space. Combining the estimations may also comprise applying methods to further reduce the uncertainties.

Figure 3A:
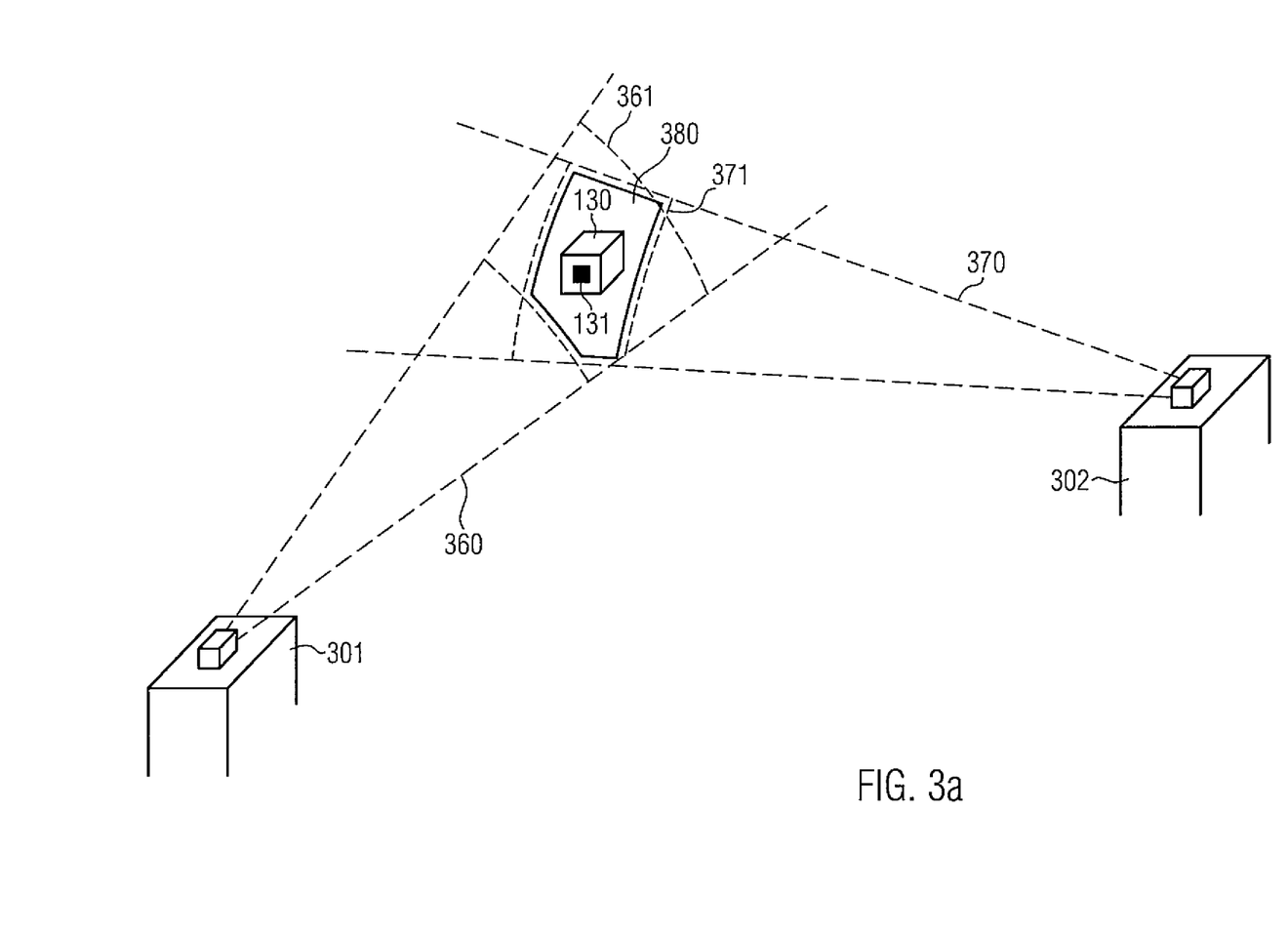
FIGS. 3a-b are schematic depictions of two embodiments used for increasing the accuracy for estimating the position of objects.
Figure 3B:
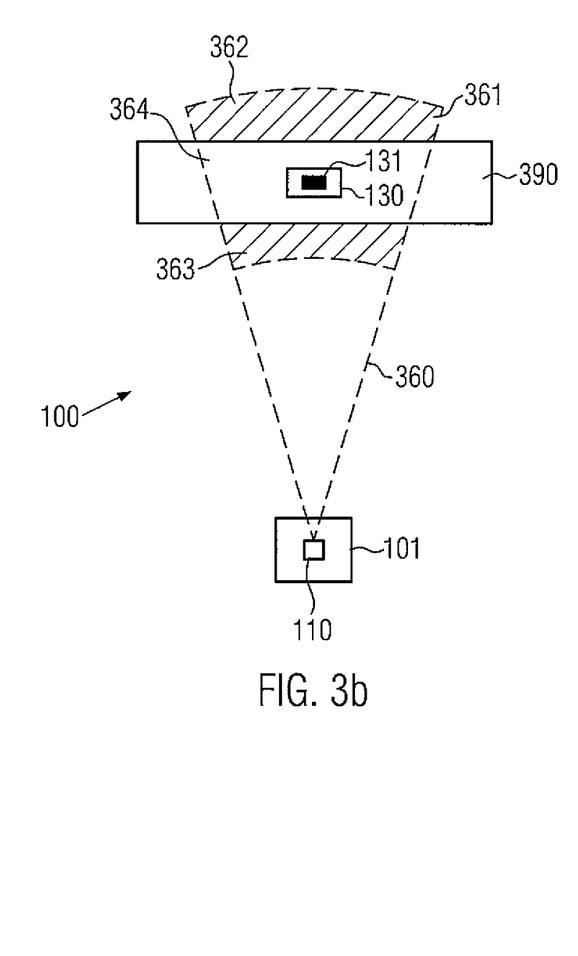

In order to increase the accuracy of the estimations, FIGS. 3a and 3b depict further embodiments.

In the embodiment shown in FIG. 3a, the position of the object in relation to an RFID reader is measured twice. This may be achieved by either measuring the position of the object 130 at different times T1 and T2 with the same RFID reader or by using more than one RFID reader that measure the position of the object either simultaneously or at different times. For ease of explanation, it may be assumed that each RFID reader transmits a radiofrequency signal which may be assumed to be approximately a spherical signal where the power of the signal depends on the angle under which it is measured and on the distance to the RFID reader transmitting the radiofrequency signal. The angular dependency and the radial dependency (the power depending on the distance) provide the possibility to determine, for a response signal received, the origin of the response signal in space (i.e. determine the location of the RFID tag) at least with some uncertainty. It may further be assumed that no angular dependency results from the response sent from the RFID tag 131. This means that all properties of the response signal only depend on the distance and angular relation of the RFID reader and the RFID tag. This should be understood such that the position of the RFID tag with respect to the RFID reader can be determined (with a given uncertainty) based on the properties of the response signal received from the RFID tag and the known properties of the radiofrequency signal (angular and radial dependency) sent by the RFID reader. While it represents a significant simplification to ignore potential influences of the properties of the response signal to the determination of the position of the RFID tag with respect to the RFID reader, it is a finding of the present invention that, even under this simplification, appropriate results for estimating the position of the RFID tag in the given space can be achieved. It is noted that this is also the case for the position of the RFID tag with respect to the RFID reader being measured only once.

In total, the above may be considered to result in the accuracy at which the RFID readers 301 and 302 (these readers may correspond to distinct RFID readers or one RFID reader measuring the position of the RFID tag from different locations) can measure the position of the object 130 to be a volume (a spherical segment) of given angular and radial size, also called an uncertainty volume.

Considering two measurements of the position of the RFID reader (and correspondingly the object) taken from different locations, it can be assumed that the respective volumes defining the accuracy at which the position of the object can be determined in each measurement are likely to overlap partially but not completely. This can be used to reduce the uncertainty volume in which the object can be estimated to be by calculating the intersection of the volumes of the two measurements and taking this as the uncertainty volume for the measurement or using the intersection of the volumes to reduce the uncertainty by applying other or additional mathematical and statistical methods. If more than two measurements are used, this can further increase the accuracy since the uncertainty volume can be reduced further by calculating the intersection volume of all the uncertainty volumes of all measurements and taking this intersection volume as the uncertainty volume for the estimation of the position in relation to the RFID reader or using the intersection volume together with other methods to reduce the uncertainty volume. This also results in an improvement of the estimation of the position of the object in the given space.

Alternatively or in addition, statistical considerations and heuristics may be used to increase the accuracy of the estimation of the position of the object in the given space.

For example, FIG. 3b depicts a top view of an object 130 placed in a shelf 390 in the given space 100. The position and size of the shelf 390 in the given space can be determined with high accuracy. For example, considering the construction phase of a warehouse, the position of each shelf can be determined once it is placed in the warehouse. This can, for example, be done within a coordinate system like the system XYZ discussed above that can later be used as the coordinate system for determining the position of the RFID reader and the RFID tag. Additionally, each time a shelf is removed or placed differently, the position of the shelf can be updated. Furthermore, since the dimensions of the shelf can also be measured with high accuracy, the position of panels within the shelf can be determined and used later in determining the position of the object in the shelf.

The measurement of the position of the object 130 with respect to the RFID reader 101 can result in an uncertainty volume 361. Sections of this volume can be outside the shelf 390. In order to reasonably improve the accuracy of the estimation of the position of the object, those sections 362 and 363 of the uncertainty volume 361 that are outside shelf 390 can be neglected and only the section 364 of the uncertainty volume 361 that lies within the shelf 390 can be considered as the uncertainty volume used for estimating the position of the object 130. This approach can be considered to be one possibility of applying a best fit model. It is noted that such an approach uses the organization of the given space as an auxiliary constraint to improve the accuracy of measurements of positions that are limited by technical constraints. A further approach to also reduce the uncertainty of the measurement of the height of the object with respect to the RFID reader could be to only consider potential positions of the RFID tag within the shelf that correspond to the RFID tag or the object to which it is attached being actually placed on one of the panels of the shelf. Sections of the uncertainty volume that have a height that would correspond to the object "flying" could, therefore, be neglected in the estimation of the position of the object. This can be further improved by considering, for example, additional information provided by the RFID reader, like the size of the object. For example, if the object would be a cube with a length of 20 cm, the position of the RFID tag cannot reasonable be more than 20 cm above the height of the shelf.

In fact, the embodiments described with respect to FIGS. 3a and 3b rely on using point clouds or other representations of probabilistic distributions instead of definite positions to estimate the position of the object 130. The point clouds are used to approximate the uncertainty volumes of the measurements of the positions in a computationally less expensive way. These point clouds or their size and correspondingly number of potential positions can not only be reduced by applying the procedure described with respect to FIG. 3a, but also by using a best fit model to determine the most likely position of the RFID tag and correspondingly the object within the respective point cloud. In addition or alternatively to the best fit model described with respect to FIG. 3b, further methods may be used. For example, the position of the object with respect to the RFID reader can be considered to be the position of the uncertainty volume nearest to the RFID reader. Additionally or alternatively, a maximum likelihood estimation may be used. For example, like objects are usually stored in the warehouse in proximity to each other. Therefore, if it is already known that an object of a given type is estimated to be in a first position, the uncertainty volume used for estimating the position of a second object of the same type may be reduced by only considering those positions within the uncertainty volume of the measurement of the position that are in proximity to the first position (for example the same shelf and/or the same panel or the like).

In total, by using the above methods, the position of an object within a given space can be determined in all three dimensions of space. In the case of the given space comprising a plurality of shelves with a number of panels, for example, this can result in an estimation of the position of the object in a specific shelf and panel.

With the above described systems and methods, it is possible to estimate the position of a detected RFID tag and the object to which the RFID tag is attached with high accuracy.

It is noted that all embodiments described above can be performed using an RFID reader mounted on a plurality of devices. In fact, the embodiments described with respect to FIGS. 1, 2 and 3a as well as 3b can be realized using RFID readers mounted on handheld devices or autonomous or semi-autonomous vehicles. Among these are autonomous and semi-autonomous vehicles, wherein movable robots or flying drones can be preferred but other realizations are also possible.

In addition, inventory can be taken and the inventory can be provided with additional information on the estimated position of the objects for which inventory was taken. This may advantageously be done by providing a single data file not only including the inventory of the objects as a data entry but also the estimated position of the respective objects within the given space being included in the same data entry or at least associated with this data entry.

Additional information may also be included in the inventory that can be coded in the RFID tag. For example, the RFID tag attached to an object may code information regarding the family, category, brand, model, size and color of an object. Reading the information coded on the RFID tag with the RFID reader, this information can be retrieved and used during taking inventory. By taking inventory several times (for example four times a day) further information regarding addition or removal of objects can be provided. Additionally, since information on the position of objects can also be provided in the inventory, it is possible to determine whether any objects are misplaced. Thereby, it is possible to obtain an inventory with information on the location of the objects in the given space as outlined in table 1.

TABLE 1

| Family | Category | Brand | Model | Size | Color | Stock | Diff. | Misplaced | Location |
|--------|----------|-------|-------|------|-------|-------|-------|-----------|----------|
| Abc | Def | Ghi | Jkl | 123 | Red | 10 | −2 | 0 | Shelf 1 Panel B |
| Mno | Pqr | Stu | Vwx | 890 | Blue | 20 | +15 | 7 | Shelf 2 Panel C Shelf 3 Panel F |

Such an inventory can advantageously be used to improve the autonomous or semi-autonomous management of warehouses and the like, thereby saving time, energy and potentially even hardware like a number of robots, compared to traditional warehouse management. For example, since the obtained information on the inventory and the location of objects can be stored in a single data file, robots or other machines for adding or removing objects from a warehouse can be provided with this information and autonomously move to the respective locations to obtain or add specific objects. This can be done without these robots requiring advanced means for locating the objects to be removed from the warehouse. In fact, since the location is already provided in the inventory, the robots adding and removing objects only need to be provided with a short range RFID reader and can otherwise navigate to the respective location using a positioning system of the given space. The short range RFID reader can be used to determine that the removed object is indeed present once the location indicated in the inventory is reached. This also reduces the distance corresponding robots have to move through a warehouse compared to inventory systems that lack indications of positions of objects in the warehouse.

Figure 4B:
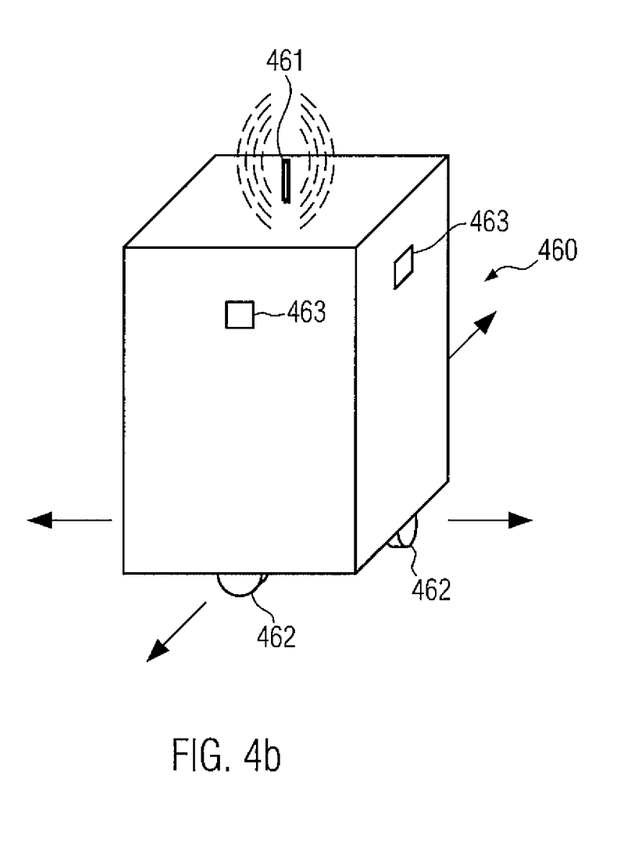
Figure 4C:
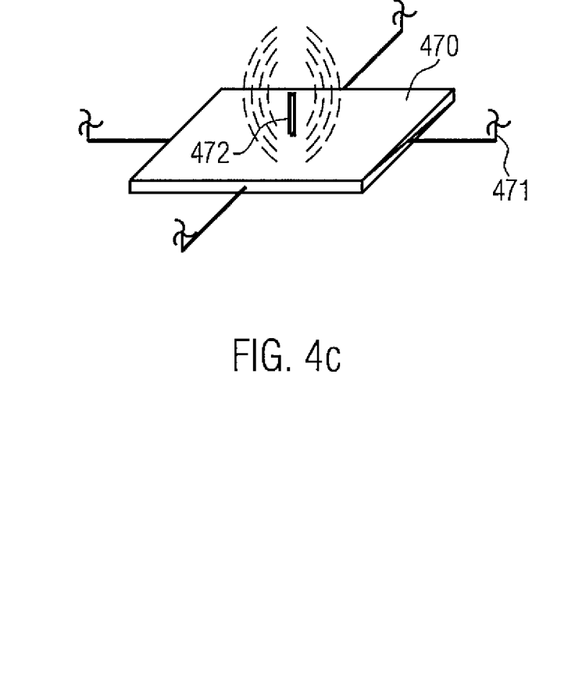

FIGS. 4a to 4c depict embodiments of devices at which RFID readers can be provided.

According to FIG. 4a, the RFID reader is mounted on or provided at a handheld device 400. The handheld device can comprise a housing 440 into which the RFID reader can be integrated. The RFID reader may comprise a processing circuit and an antenna 410 for transmitting and receiving radiofrequency signals at specific frequencies. In general, the RFID reader may comprise any components necessary in order to detect RFID tags. The RFID reader may further comprise means for evaluating response signals received from RFID tags in order to determine their position or even perform tasks regarding estimating the position of the RFID tags with respect to the RFID reader. This holds not only for the embodiment of the RFID reader being provided as part of a handheld device as depicted in FIG. 4a but also for FIGS. 4b and 4c.

Furthermore, the handheld device may comprise a display 420 in which information can be displayed. A keyboard or other input means 430 may be provided together with the display. Alternatively, the display 420 may be provided as a touchdisplay (e.g., a touchscreen) or a generally interactive display.

As described with respect to FIG. 1, means for measuring or determining the position of the RFID reader in the given space can be associated with the RFID reader. In the case of the RFID reader being provided in the handheld device shown in FIG. 4a, these means may be the means 450. These means can comprise, for example, cameras in case the external means 120 described in FIG. 1 are LEDs. Otherwise, the means 450 may be radiofrequency transceivers or acoustic emitters or receivers (microphones) that can be used in combination with external means to determine the position of the handheld device and hence the RFID reader within the given space with a given accuracy.

In general, in order to reduce the weight of the handheld device, as few components as possible should be integrated in the handheld device. Nevertheless, in order to refine the determination of the orientation of the RFID reader within the given space, internal sensors like gyroscopes and inclinometers can be provided within the handheld device.

In the embodiment of FIG. 4b, the RFID reader is integrated into a movable robot 460. The robot may be movable autonomously on a semi-autonomously, i.e. requiring no manual input or requiring manual input for navigating through the given space. In order to move through the given space, the robot 460 may comprise a plurality of wheels 462 or other mechanisms for changing its position at least within a plane, as depicted with the arrows.

Again, the RFID reader is integrated in the robot 460 and comprises at least an antenna 461 for receiving and transmitting radiofrequency signals in order to determine the position of RFID tags with respect to the RFID reader. Since the weight of the components integrated into the robot is of less importance compared to a handheld device that has to be carried around by an operator, more than one antenna 461 can be provided in order to improve the signal coverage and also the accuracy with which the position of an RFID tag can be measured by utilizing simultaneous measurements of a plurality of antennas.

Furthermore, means 463 can be provided on the robot that can be used to cooperate with the external means 120 as depicted in FIG. 1 to determine and estimate the position of the robot within the given space with a given accuracy. Furthermore, the robot can include internal sensors like odometry sensors to aid in determining the position of the robot and, hence, the RFID reader within the given space. Since the robot or at least the antenna 461 is usually not tilted when moving the robot within the given space, inclinometers do not need to be provided to the robot for the purpose of determining tilting of the RFID reader. However, they may nevertheless be provided for example for security reasons in order to prevent tipping over of the robot on a ramp or the like. Additionally, accelerometers and compasses as well as laser ranging systems and three-dimensional cameras can be provided at the robot.

FIG. 4c depicts a third embodiment in which the RFID reader is integrated into a drone 470. The drone according to this embodiment is a flying drone comprising one or more drive means 471 like airscrews in order to allow moving the drone 470 through the given space. As described with respect to the robot, a plurality of antennas 472 can be provided for measuring the position of RFID tags with respect to the drone 470. Additionally, like also described with respect to the robot, additional sensors for aiding in estimating the position of the drone and, hence, the RFID reader within the given space can be provided. These can correspond to those provided within the robot. However, odometry sensors may not be provided in a flying drone.

FIG. 5 depicts a further embodiment of a handheld device 500 into which the RFID reader could be integrated. That device is not limited to the handheld device depicted in FIG. 4a but could also refer to a remote control for controlling or supervising or observing the movements of autonomous or semi-autonomous vehicles moving through the given space for taking inventory and determining the position of objects within the given space, as depicted for example in FIGS. 4b and 4c.

In the embodiment in FIG. 5, the handheld device 500 comprises a display 501. On this display, a map of the given space or at least a section thereof can be displayed. The map can be a two-dimensional top view depicting one or more shelves 511 to 517 or other storage systems within the given space. An indication 520 can be provided on the display 501 to indicate the position of the RFID reader or the device to which it is attached within the given space. In the case of the handheld device depicted in FIG. 5 being the handheld device described in FIG. 4a, the indication can also be considered to be an indication of the position of the user actually holding the handheld device 500.

Additionally, an indication 530 is provided that indicates areas for which inventory was already taken and/or the position of objects was already determined/estimated. This indication can comprise, for example, borders as depicted with the dashed line that include sections of the given space. Furthermore, a color indication may be provided to those areas for which inventory was already taken. Additionally, indications depending on the degree of the inventory (the number of objects detected compared to the overall number of objects in the given area) already taken can be provided. For example, in case it is determined that only half of the objects within a given area of the given space were determined and recognized during inventory taking, the area can be colored in yellow, whereas areas that were not visited at all can be colored red and areas for which it can be assumed that taking inventory and determining the position of the objects is already finished can be colored green.

Depending on these indications, a user can decide to return to some areas or start taking inventory in specific areas of the given space he has not visited previously. Alternatively, in case of the handheld device 500 being a remote control for controlling a robot or drone, the robot or drone can be instructed to take inventory of the respective areas by, for example, providing a functionality that allows for touching the specific areas to indicate, to the robot or drone, that he is to move to this area and take inventory. The device may further be adapted to provide an indication of the most effective way to travel through the given space to reach an area in which inventory should be taken.

What is claimed is:

1. A system for taking inventory of, and estimating a position of, objects comprising radio-frequency identification (RFID) tags, the system comprising:
    an RFID reader moveable in a given space and suitable for detecting RFID tags in the given space;
    means for estimating at least one of a position of the RFID reader or an orientation of the RFID reader in the given space, comprising at least means external to the RFID reader for measuring at least one of the position of the RFID reader or the orientation of the RFID reader, wherein at least a first part of the means external to the RFID reader is moved together with the RFID reader through the given space and at least a second part of the means external to the RFID reader is not moved together with the RFID reader through the given space, and wherein the first part of the means external to the RFID reader is configured to transmit a first signal to the second part of the means external to the RFID reader as the RFID reader is moved in the given space;
    means for estimating a position of the RFID tags with respect to the RFID reader, wherein the position of the RFID tags with respect to the RFID reader is estimated using at least one of: a geometric model of the RFID reader, an electromagnetic radiation model of the RFID reader, or a measured model of the RFID reader;
    the system being adapted to estimate, using a computing system that is not moved together with the RFID reader through the given space, the at least one of the position of the RFID reader or the orientation of the RFID reader in the given space based on the first signal transmitted from the first part of the means external to the RFID reader to the second part of the means external to the RFID reader;
    the system being adapted to estimate the position of the objects in the given space using the estimated position of the RFID tags with respect to the RFID reader and at least one of the estimated position of the RFID reader or the estimated orientation of the RFID reader in the given space; and
    the system being adapted to take inventory of the objects using at least information on detected RFID tags.

2. The system of claim 1, wherein the RFID reader is provided as part of a handheld device.

3. The system of claim 1, wherein the RFID reader is mounted on an autonomous or semiautonomous vehicle.

4. The system of claim 1, wherein at least two RFID readers comprising the RFID reader and a second RFID reader are provided to be moveable in the given space, wherein the system is further adapted to estimate, using the computing system, at least one of an additional position of the second RFID reader or an additional orientation of the second RFID reader in the given space based on a second signal transmitted from a first part of means external to the second RFID reader to a second part of the means external to the second RFID reader.

5. The system of claim 1, wherein one or more first radio-frequency transceivers are provided in the given space, wherein each of the one or more first radio-frequency transceivers comprises one or more antennas, and wherein one or more second radio-frequency transceivers are provided at or associated with the RFID reader;
wherein the first signal is transmitted from the one or more second radio-frequency transceivers to the one or more first radio-frequency transceivers, and wherein the computing system of the system is adapted to use the first signal to estimate at least one of the position of the RFID reader or the orientation of the RFID reader in the given space.

6. The system of claim 1, wherein a) one or more light emitters are provided in the given space and one or more cameras are provided at or associated with the RFID reader or b) one or more light emitters are provided at or associated with the RFID reader and one or more cameras are provided in the given space;
the cameras being adapted to detect light of at least one of the one or more light emitters;
wherein the computing system of the system is adapted to use information on the detected light to estimate at least one of the position of the RFID reader or the orientation of the RFID reader.

7. The system of claim 6, wherein at least two light emitters are provided, each light emitter of the at least two light emitters being adapted to emit light differing from each other light emitter of the at least two light emitters in at least one of: brightness, frequency, modulation in time, spatial distribution.

8. The system of claim 1, wherein the system is further adapted to generate a plurality of measurements corresponding to the position of the RFID tags with respect to the RFID reader as the RFID reader moves through the given space.

9. A method of taking inventory of objects and estimating a position of the objects, wherein the objects comprise radio-frequency identification (RFID) tags, the method comprising:
detecting RFID tags in a given space using an RFID reader that moves in the given space;
estimating at least one of a position of the RFID reader or an orientation of the RFID reader in the given space using at least one of position data or orientation data from a source external to the RFID reader, wherein the at least one of the position of the RFID reader or the orientation of the RFID reader in the given space is estimated based on a signal transmitted from a first part of means external to the RFID reader to a second part of means external to the RFID reader, wherein the means external to the RFID reader are configured to measure the at least one of the position of the RFID reader or the orientation of the RFID reader, and wherein the first part of the means external to the RFID reader is moved with the RFID reader in the given space and the second part of the means external to the RFID reader are not moved with the RFID reader in the given space;
estimating, by a computing system that does not move with the RFID reader, using at least one of: a geometric model of the RFID reader, an electromagnetic radiation model of the RFID reader, or a measured model of the RFID reader, a position of the RFID tags with respect to the RFID reader;
estimating, by the computing system, the position of the objects in the given space using the estimated position of the RFID tags with respect to the RFID reader and at least one of the estimated position of the RFID reader or the estimated orientation of the RFID reader in the given space; and
taking inventory of the objects using at least information on the detected RFID tags.

10. The method according to claim 9, wherein estimating the position of the RFID tag with respect to the RFID reader comprises using a point cloud covering a volume in which the RFID tag could be and using a best fit model to determine a most likely position of the RFID tag within the point cloud.

11. The method according to claim 10, wherein the most likely position is determined using a minimum distance or a maximum likelihood.

12. The method according to claim 10, wherein a heuristic is used to determine the most likely position of the RFID tag within the point cloud.

13. The method according to claim 9, wherein the position of an object in the given space is estimated using at least two estimations of the position of the RFID tag with respect to at least one of the RFID reader or an additional RFID reader and corresponding estimations of the position of at least one of the RFID reader or the additional RFID reader in the given space.

14. The method of claim 9, wherein a data file is generated comprising an inventory of the objects, wherein a data entry is provided for each object, and wherein the estimated position of the object within the given space is provided in or associated with the data entry.

15. The method according to claim 8, further comprising:
providing an indication on a display of a handheld device, the indication indicating, for areas of the given space, at least one of a) whether inventory was already taken, b) whether the position of the objects in these areas was already determined or c) whether the position of the objects in these areas was already estimated.

16. A system for taking inventory of, and estimating a position of, objects comprising radio-frequency identification (RFID) tags, the system comprising:
an RFID reader moveable in a given space and suitable for detecting RFID tags in the given space;
one or more first signal components associated with the RFID reader, each comprising at least one of a camera, a light emitter, a radiofrequency transceiver, an acoustic emitter or an acoustic receiver configured to generate at least one of position data or orientation data for the RFID reader, wherein the one or more first signal components are moved together with the RFID reader through the given space;
one or more second signal components each comprising at least one of a camera, a light emitter, a radiofrequency transceiver, an acoustic emitter, or an acoustic receiver, wherein the one or more second signal components are not moved together with the RFID reader through the given space; and a computing system, which is not moved together with the RFID reader through the given space, to:
  estimate at least one of a position of the RFID reader or an orientation of the RFID reader in the given space based on a first signal comprising at least one of the position data or the orientation data generated by the one or more first signal components and transmitted to the one or more second signal components;
  estimate a position of the RFID tags with respect to the RFID reader using at least one of a geometric model of the RFID reader, an electromagnetic radiation model of the RFID reader, or a measured model of the RFID reader;
  estimate the position of the objects in the given space using the estimated position of the RFID tags with respect to the RFID reader and at least one of the estimated position of the RFID reader or the estimated orientation of the RFID reader in the given space; and
  take inventory of the objects using at least information on detected RFID tags.

17. The system of claim 16, wherein the RFID reader is a) provided as part of a handheld device or b) mounted on an autonomous or semiautonomous vehicle.

18. The system of claim 16, wherein at least two RFID readers comprising the RFID reader and a second RFID reader are provided to be moveable in the given space, wherein the system is further adapted to estimate, using the computing system, at least one of an additional position of the second RFID reader or an additional orientation of the second RFID reader in the given space based on a second signal transmitted from one of more first components associated with the second RFID reader to the one or more second signal components.

19. The system of claim 16, wherein the one or more first signal components comprise one or more first radio-frequency transceivers and the one or more second signal components comprise one or more second radio-frequency transceivers, and wherein each of the one or more second radio-frequency transceivers comprises one or more antennas, and wherein the one or more first radio-frequency transceivers are provided at or associated with the RFID reader;
  wherein the first signal is transmitted from the one or more first radio-frequency transceivers to the one or more second radio-frequency transceivers, and wherein the system is adapted to use the first signal to estimate at least one of the position of the RFID reader or the orientation of the RFID reader in the given space.

20. The system of claim 16, wherein a) the one or more second signal components comprise one or more light emitters provided in the given space and the one or more first signal components comprise one or more cameras provided at or associated with the RFID reader or b) the one or more first signal components comprise one or more light emitters provided at or associated with the RFID reader and the one or more second signal components comprise one or more cameras provided in the given space;
  the cameras being adapted to detect light of at least one of the one or more light emitters;
  wherein the computing system is adapted to use information on the detected light to estimate at least one of the position of the RFID reader or the orientation of the RFID reader.

* * * * *